(12) United States Patent
Iizuka et al.

(10) Patent No.: US 9,576,110 B2
(45) Date of Patent: *Feb. 21, 2017

(54) ACCESS CONTROL APPARATUS, ACCESS CONTROL METHOD, AND PRINTING SYSTEM

(71) Applicant: CANON KABUSHIKI KAISHA, Tokyo (JP)

(72) Inventors: Hiroko Iizuka, Hachioji (JP); Yasuhiro Hosoda, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/970,795

(22) Filed: Aug. 20, 2013

(65) Prior Publication Data

US 2013/0340070 A1 Dec. 19, 2013

Related U.S. Application Data

(63) Continuation of application No. 11/942,554, filed on Nov. 19, 2007, now Pat. No. 8,537,385.

(30) Foreign Application Priority Data

Nov. 30, 2006 (JP) .................................. 2006-323746

(51) Int. Cl.
*G06F 21/00* (2013.01)
*G06F 21/60* (2013.01)
(Continued)

(52) U.S. Cl.
CPC ............. *G06F 21/00* (2013.01); *G06F 21/608* (2013.01); *H04L 63/0807* (2013.01); *H04L 63/101* (2013.01); *H04L 63/126* (2013.01); *H04N 1/00204* (2013.01); *H04N 1/00244* (2013.01); *H04N 1/00278* (2013.01); *H04N 1/4406* (2013.01); *H04N 1/4426* (2013.01); *H04N 1/4433* (2013.01); *H04L 29/1216* (2013.01);
(Continued)

(58) Field of Classification Search
None
See application file for complete search history.

(56) References Cited

U.S. PATENT DOCUMENTS 7,490,347 B1 * 2/2009 Schneider et al. ................ 726/2
8,429,708 B1 * 4/2013 Tandon .................... G06F 21/00
380/247

(Continued)

*Primary Examiner* — Fan Zhang
(74) *Attorney, Agent, or Firm* — Canon USA, Inc. IP Division

(57) ABSTRACT

In a multi-domain environment, an access control apparatus belonging to a first domain obtains access control information for controlling usage of a function of an image forming apparatus corresponding to a user belonging to the first domain. When the user belonging to the first domain instructs usage of a function of an image forming apparatus belonging to a second domain, the access control apparatus belonging to the first domain requests an access control apparatus belonging to the second domain to add authentication information managed by the second domain to the access control information. The access control apparatus belonging to the first domain transmits access control information including the added authentication information to a client computer.

13 Claims, 17 Drawing Sheets

(51) Int. Cl.
    *H04L 29/06* (2006.01)
    *H04N 1/00* (2006.01)
    *H04N 1/44* (2006.01)
    *H04L 29/12* (2006.01)

(52) U.S. Cl.
    CPC ..... *H04L 61/157* (2013.01); *H04N 2201/0039* (2013.01)

(56) References Cited

U.S. PATENT DOCUMENTS

| | | | |
|---|---|---|---|
| 2005/0223014 A1* | 10/2005 | Sharma et al. | 707/10 |
| 2005/0277420 A1* | 12/2005 | Shin et al. | 455/442 |
| 2007/0019229 A1* | 1/2007 | Matsuhara | 358/1.15 |
| 2007/0124799 A1* | 5/2007 | Osamura et al. | 726/2 |
| 2008/0043274 A1* | 2/2008 | Wang et al. | 358/1.14 |

\* cited by examiner

FIG. 5

| USER NAME | PASSWORD | USABLE DEVICE | PRINT RIGHT | | | | | | APPLICATION/SERVICE USAGE RIGHT 501 | | | |
|---|---|---|---|---|---|---|---|---|---|---|---|---|
| | | | CL | BW | 2-SIDED | 1-SIDED | N-up | NUMBER OF PRINTABLE SHEETS | SCAN | COPY | FAX | PRINT |
| A | -sa98dfy | iR1, lbp2 | 0 | 1 | 1 | 0 | 2 | 1000 | 0 | 1 | 1 | 1 |
| B | 8er87 | iRC2, iR1, lbp2 | 1 | 1 | 1 | 1 | * | 2000 | 1 | 1 | 1 | 1 |
| C | [sdoiy-e | iR1 | 0 | 1 | 1 | 0 | 2 | 1500 | 0 | 1 | 0 | 0 |
| | | | | | | | | | | | | |

FIG. 10

| DEVICE NAME | IP ADDRESS | SERIAL NUMBER |
|---|---|---|
| IMAGE FORMING APPARATUS 109 | 172.12.34.56 | X1234 |
| IMAGE FORMING APPARATUS · · · | 172.12.34.78 | X5678 |
| IMAGE FORMING APPARATUS · · · | 172.12.34.910 | X9101 |
| ······ | ······ | ······ |

FIG. 11

```
<?xml version="1.0" encoding="UTF-8"?>
<ACT xmlns:xsi="http://www.w3.org/2001/XMLSchema-instande">
  <Version>0</Version>
  <UserInfo>                                                          ⎫
    <UserName>Taro</UserName>                                         |
    <BaseRole>PowerUser</BaseRole>                                    ⎬ 751
    <UserEmail>taro@xxx.yyy</UserEmail>                               |
  </UserInfo>                                                         |
  <DeviceInfo>                                                        |
    <PrintSecurityLevel>0</PrintSecurityLevel>                        |
  </DeviseInfo>                                                       ⎭
  <DeviceAccessControl>
    <AttributeCategory Name="DeviceCapabilityRestriction"CategoryStatus="Static">   ⎫
      <saml:AttributeStatement>                                                      |
        <saml:Attribute Name="PdlPrint">                                             |
          <saml:AttributeValue Name="PdlPrintFlag">Permit</saml:AttributeValue>      |
          <saml:AttributeValue Name="ColorPrint">Color</saml:AttributeValue>         ⎬ 752
          <saml:AttributeValue Name="Simplex">Deny</saml:AttributeValue>             |
        </saml:Attribute>                                                            |
      </saml:AttributeStatement>                                                     |
    </AttributeCategory>                                                             ⎭
    <AttributeCategory Name="QuotaRestriction"CategoryStatus="Dynamic">              ⎫
      <saml:AttributeStatement>                                                      |
        <saml:Attribute Name="Print">                                                |
          <saml:AttributeValue Name="ColorPrintTotal">1000</saml:AttributeValue>     ⎬ 753
          <saml:AttributeValue Name="BwPrintTotal">1000</saml:AttributeValue>        |
        </saml:Attribute>                                                            |
      </saml:AttributeStatement>                                                     |
    </AttributeCategory>                                                             ⎭
  </DeviceAccessControl>
</ACT>
```

FIG. 15

| DOMAIN OF USER | USAGE OF IMAGE FORMING APPARATUS |
|---|---|
| DomainB | INHIBITED |
| DomainC | PERMITTED |
| ... | |

FIG. 16

| | USER NAME | PASSWORD | PRINT RIGHT ||||||| APPLICATION/SERVICE USAGE RIGHT ||||
|---|---|---|---|---|---|---|---|---|---|---|---|---|
| | | | COLOR | BW | 2-SIDED | 1-SIDED | N-up | MAXIMUM NUMBER OF PRINTABLE SHEETS | SCAN | COPY | FAX | PRINT |
| D100 | DEFAULT | | 1 | 1 | 1 | 1 | 2 | 1000 | 1 | 1 | 0 | 1 |
| D101 | DomainB DEFAULT | | 1 | 1 | 1 | 1 | 2 | 1000 | 1 | 1 | 0 | 1 |
| D102 | DomainC DEFAULT | | 1 | 1 | 1 | 1 | 2 | 1000 | 1 | 1 | 0 | 1 |
| U200 | suzuki@domainA.jp | **** | 0 | 1 | 1 | 0 | 2 | 1000 | 0 | 1 | 1 | 1 |
| U201 | tanaka@domainA.jp | **** | 1 | 1 | 1 | 1 | * | 2000 | 1 | 1 | 1 | 1 |
| U202 | sato@domainA.jp | **** | 0 | 1 | 1 | 0 | 2 | 1500 | 0 | 1 | 0 | 0 |
| U300 | yamada@domainB.jp | **** | 0 | 1 | 1 | 0 | 2 | 1000 | 0 | 1 | 1 | 1 |
| U301 | takahashi@domainB.jp | **** | 1 | 1 | 1 | 1 | * | 2000 | 1 | 1 | 1 | 1 |
| U302 | suzuki@domainB.jp | **** | 0 | 1 | 1 | 0 | 2 | 1500 | 0 | 1 | 0 | 0 |
| | ...... | | | | | | | | | | | |

ACCESS CONTROL APPARATUS, ACCESS CONTROL METHOD, AND PRINTING SYSTEM

CROSS REFERENCE OF RELATED APPLICATIONS

This application is a continuation of U.S. application Ser. No. 11/942,554 filed Nov. 19, 2007 which claims priority from Japanese Patent Application No. 2006-323746 filed Nov. 30, 2006, each of which is hereby incorporated by reference herein in its entirety.

BACKGROUND OF THE INVENTION

Field of the Invention

The present invention relates to a printing system capable of flexibly restricting the functions of an image forming apparatus in a multi-domain environment that manages users and office automation (OA) devices belonging to different areas.

Description of the Related Art

As discussed in Japanese Patent Application Laid-Open No. 2003-150336, an access control server issues an access ticket with electronic signature when a user is successfully authenticated in usage of a function of an image forming apparatus. The access ticket includes information relating to a user and various settings (e.g., the number of printable sheets) being set for the user. When the electronic signature of an access ticket is verified, a user can use a print or other function of the image forming apparatus.

In the above-described conventional system, an image forming apparatus managed by the access control server that issues an access ticket is required beforehand to obtain a public key of the server for verification/authentication of an access ticket. In general, each domain in such a multi-domain environment includes a dedicated access control server. When a user of a domain requests a print operation using a printing apparatus belonging to another domain, the user transmits an access ticket issued by a user's access control server to the printing apparatus of another domain.

Therefore, when an image forming apparatus of a domain receives a print request from another domain in a multi-domain environment, the image forming apparatus cannot verify an access ticket issued by a server belonging to another domain and therefore cannot process the received print request. Namely, the above-described conventional system cannot perform a print control according to an access ticket in a multi-domain environment.

SUMMARY OF THE INVENTION

Exemplary embodiments of the present invention are directed to an access control apparatus capable of flexibly restricting functions (e.g., print settings) of an image forming apparatus in a multi-domain environment.

According to an aspect of the present invention, an embodiment is directed to an access control apparatus belonging to a first domain in a multi-domain environment. The apparatus includes an acquisition unit configured to obtain access control information for controlling usage of a function of an image forming apparatus corresponding to a user belonging to the first domain, a request unit configured to request an access control apparatus belonging to a second domain to add authentication information managed by the second domain to the access control information obtained by the acquisition unit, when the user belonging to the first domain instructs usage of a function of an image forming apparatus belonging to the second domain, and a transmitting unit configured to transmit access control information including the added authentication information to a client computer.

According to another aspect of the present invention, an embodiment is directed to an access control apparatus belonging to a first domain in a multi-domain environment. The apparatus includes a request unit configured to request access control information for controlling usage of a function of an image forming apparatus corresponding to a user belonging to the second domain, from an access control apparatus belonging to the second domain, when a user belonging to a second domain instructs usage of a function of an image forming apparatus belonging to the first domain, an adding unit configured to add authentication information managed by the first domain to the access control information obtained by the request unit, and a transmitting unit configured to transmit the access control information including the added authentication information to the image forming apparatus belonging to the first domain.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates an example of a data table managed by an access control list (ACL) database.

FIG. 10 illustrates an exemplary registration table of an image forming apparatus managed by each domain.

FIG. 11 illustrates exemplary ACT data.

FIG. 15 illustrates a domain user right management table.

FIG. 16 illustrates an ACL data table according to a third exemplary embodiment of the present invention.

DETAILED DESCRIPTION OF THE EMBODIMENTS

Figure 1:
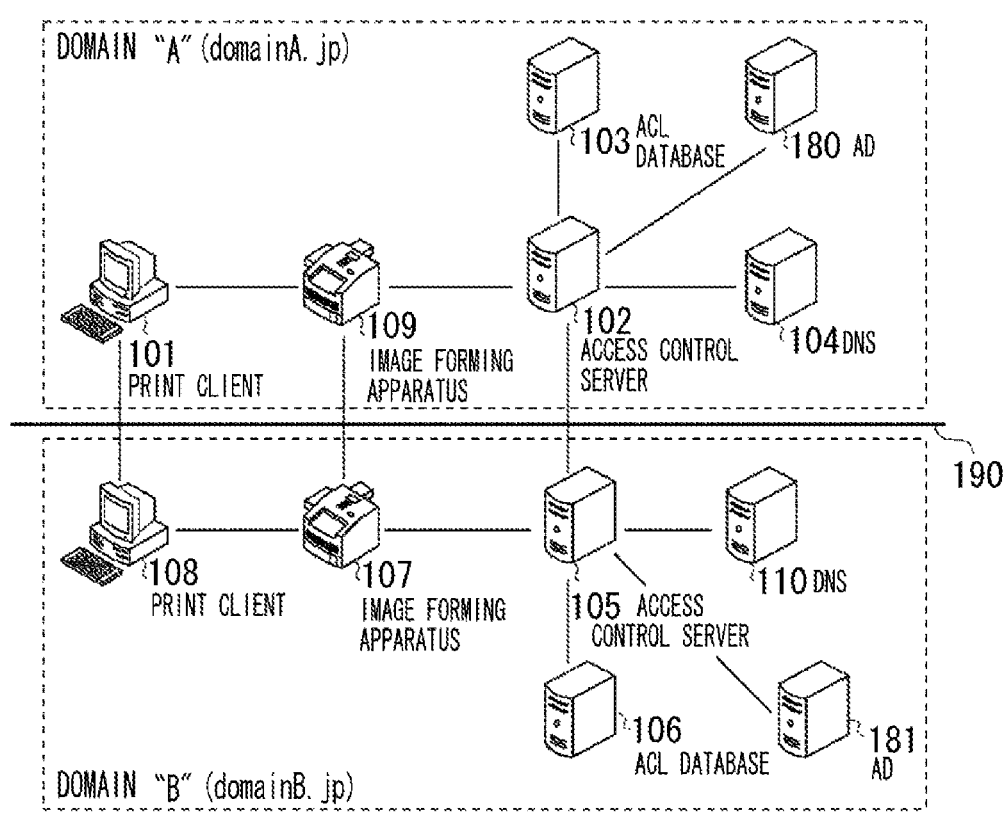
FIG. 1 illustrates a network configuration in a multi-domain environment according to an exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 illustrates a network configuration in a multi-domain environment according to an exemplary embodiment of the present invention.

A domain "A" includes a print client (i.e., a client computer) 101 that issues a print request, an access control server 102 that issues an access control token (ACT), an ACL database 103 that holds an access control list (ACL), a domain name server (DNS) 104 that searches an access control server according to a fully qualified domain name (FQDN) of an image forming apparatus, and an image forming apparatus 109. Similarly, a domain "B" includes a print client 108, an access control server 105, an ACL database 106, a domain name server (DNS) 110, and an image forming apparatus 107. The above-described devices 101 to 109 can communicate with each other via a network.

In this embodiment, the ACT indicates access control information including authentication information added by an access control server. Security of the ACT is secured. The ACL is a list of access control information. The authentication information used in an exemplary embodiment of the present invention is electronic signature (hereinafter, referred to as "signature") to be managed in each domain. However, the authentication information is not limited to electronic signature and may be any other information capable of identifying an ID of a domain.

The FQDN is a fully qualified domain name. The DNS is a server which is capable of performing a name resolution and is configured to search an IP address according to the FQDN.

Figure 2:
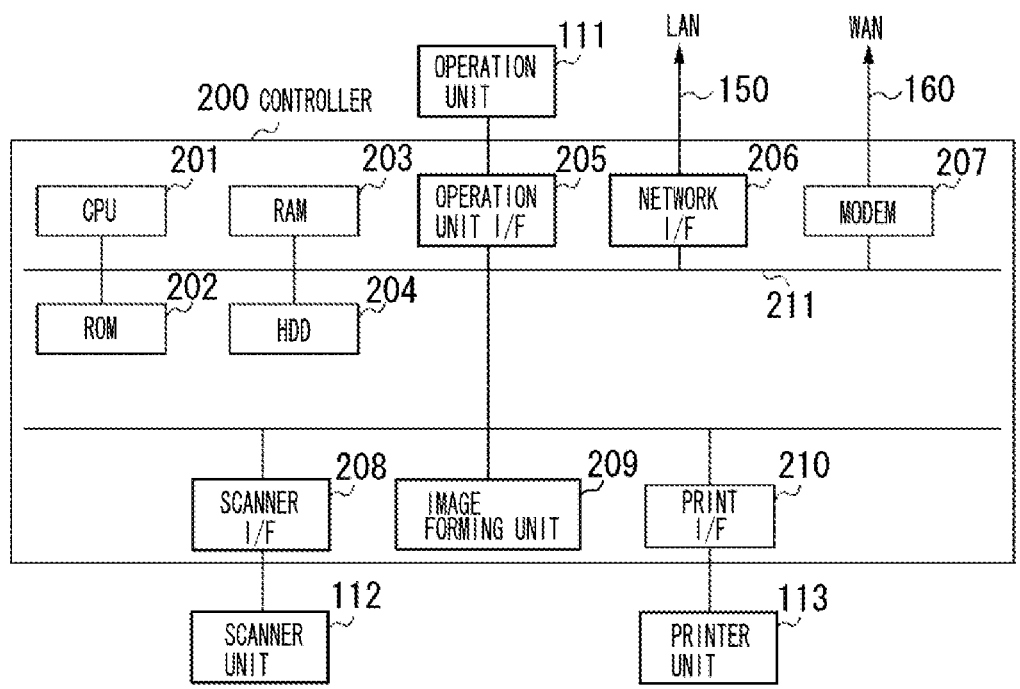
FIG. 2 illustrates an exemplary hardware configuration of an image forming apparatus.

FIG. 2 is a block diagram illustrating a hardware configuration of the image forming apparatus 107 (or 109) illustrated in FIG. 1.

The image forming apparatus 107 (or 109) includes a scanner unit 112 serving as an image input unit, a printer unit 113 serving as an image output unit, a controller 200 performing an overall control of the apparatus, and an operation unit 111 such as a user interface (UI).

The controller 200 is electrically connected to the scanner unit 112 and the printer unit 113, and can communicate with an external client PC via a local area network (LAN) 150 or a wide area network (WAN) 160. Thus, the controller 200 can input/output image data and device information from/to these devices.

A central processing unit (CPU) 201 controls an access to various devices connected to the controller 200 based on a control program stored in a read only memory (ROM) 202, and also controls various processing performed in the controller 200.

The ROM 202 stores a boot program of the apparatus.

A random access memory (RAM) 203 is a system work memory of the CPU 201 and a storage unit temporarily storing image data. The RAM 203 is, for example, a static random access memory (SRAM) that holds memorized contents when an electric power source is turned off, or a dynamic random access memory (DRAM) that erases memorized contents when the electric power source is turned off.

A hard disk drive (HDD) 204 can store system software and image data.

An operation unit I/F 205 is an interface unit that can connect the system bus 211 to the operation unit 111. The operation unit I/F 205 receives image data via the system bus 211 and outputs the image data to the operation unit 111 that displays an image based on the received image data. On the other hand, the operation unit I/F 205 receives information input via the operation unit 111 and outputs the input information to the system bus 211.

A network I/F 206 performs information input/output processing between the LAN 150 and the system bus 211.

A modem 207 performs information input/output processing between the WAN 160 and the system bus 211.

A scanner I/F 208 performs correction, modification, and edit processing on image data received from the scanner unit 112. The scanner I/F 208 determines whether a document of received image data is a color document or a monochrome document, or a text document or a photographic document. Then, the scanner I/F 208 adds determination result (referred to as "attribute data") to the image data.

The scanner unit 112 includes a charge coupled device (CCD) that receives reflection light of a document image obtained by exposure scanning and converts image information into an electric signal. Furthermore, the scanner unit 112 converts the electric signal into luminance signals of R, G, and B colors, and outputs the luminance signals as image data to the controller 200. A user can put a document on a document feeder and instruct initiating a reading operation of the document via the operation unit 111.

In response to an instruction input by a user, the controller 200 outputs a document reading instruction to the scanner unit 112. In response to the document reading instruction, a document feeder automatically feeds documents one by one and the scanner unit 112 performs a document reading operation. Another exemplary document reading method may include manually placing a document on a platen glass (not illustrated) and causing an exposure unit to move and perform a document scanning operation.

An image forming unit 209 performs processing for converting the orientation of image data and also performs image compression/expansion processing on image data. The image forming unit 209 can interpret page description language (PDL) data. The image forming unit 209 receives PDL data instructed from a computer accessible via the LAN 150 and converts the received PDL data into bitmap or other image data.

A printer I/F 210 receives image data from the image forming unit 209 and performs image forming processing on image data with reference to attribute data attached to the image data. The printer I/F 210 outputs, to the printer unit 113, the image data having been subjected to the image forming processing.

The printer unit 113 forms an image on a sheet based on the image data received from the controller 200. An image forming system according to an exemplary embodiment is an electrophotographic system including a photosensitive drum or a photosensitive belt. Another image forming system according to an exemplary embodiment may be an inkjet system that includes a micro nozzle array capable of discharging ink onto a sheet to print an image.

A user can input instruction or information via the operation unit 111, or from a client PC connected to the LAN 150, to the image forming apparatus 107 (or 109).

The image forming apparatus 107 (or 109) may have a data transmission function (including processes of reading a document image and transmitting read image data to each apparatus accessible via the LAN 150) in addition to a copying function and a facsimile function. Furthermore, the image forming apparatus 107 (or 109) can store an image read by the scanner unit 112 and PDL data instructed by a computer connected to the LAN 150 in a specific area of the hard disk 204.

Figure 3:
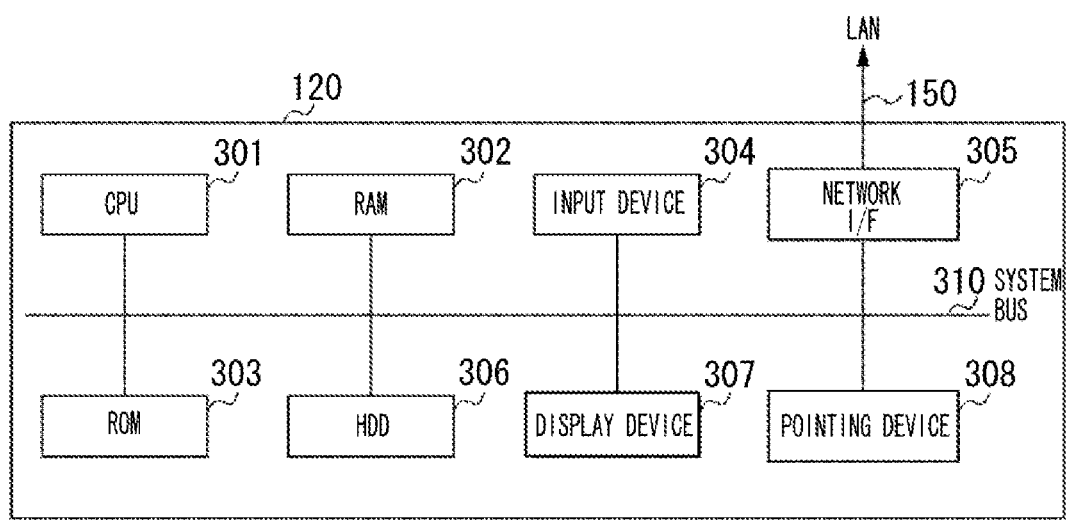
FIG. 3 illustrates an exemplary hardware configuration of a print client or an access control server.

FIG. 3 is a block diagram illustrating an exemplary hardware configuration applicable to the access control servers 102 and 105, the print clients 101 and 108, and the ACL databases 103 and 106, and the DNSs 104 and 110.

In FIG. 3, a CPU 301, a RAM 302, a ROM 303, an input device 304 (e.g., a keyboard), a network I/F 305, a hard disk drive (HDD) 306, a display device 307 (e.g., a cathode ray tube (CRT)), and a pointing device 308 (e.g., a mouse) can communicate with each other via a system bus 310.

The ROM 303 or the HDD 306 stores a control program. The CPU 301, having a computing function, executes the control program loaded into the RAM 302 from the ROM 303 or the HDD 306.

The CPU 301 causes the display device 307 to display various information/data and receives user instruction via the input device 304 or the pointing device 308. Furthermore, the CPU 301 can communicate via the network I/F 305 with other apparatus connected to the LAN 150.

Next, an exemplary operation performed by the access control server 102 (or 105), the print client 101 (or 108), the image forming apparatus 109 (or 107), the ACL database 103 (or 106), and DNS 104 (or 110) is described with reference to FIG. 4.

Figure 4:
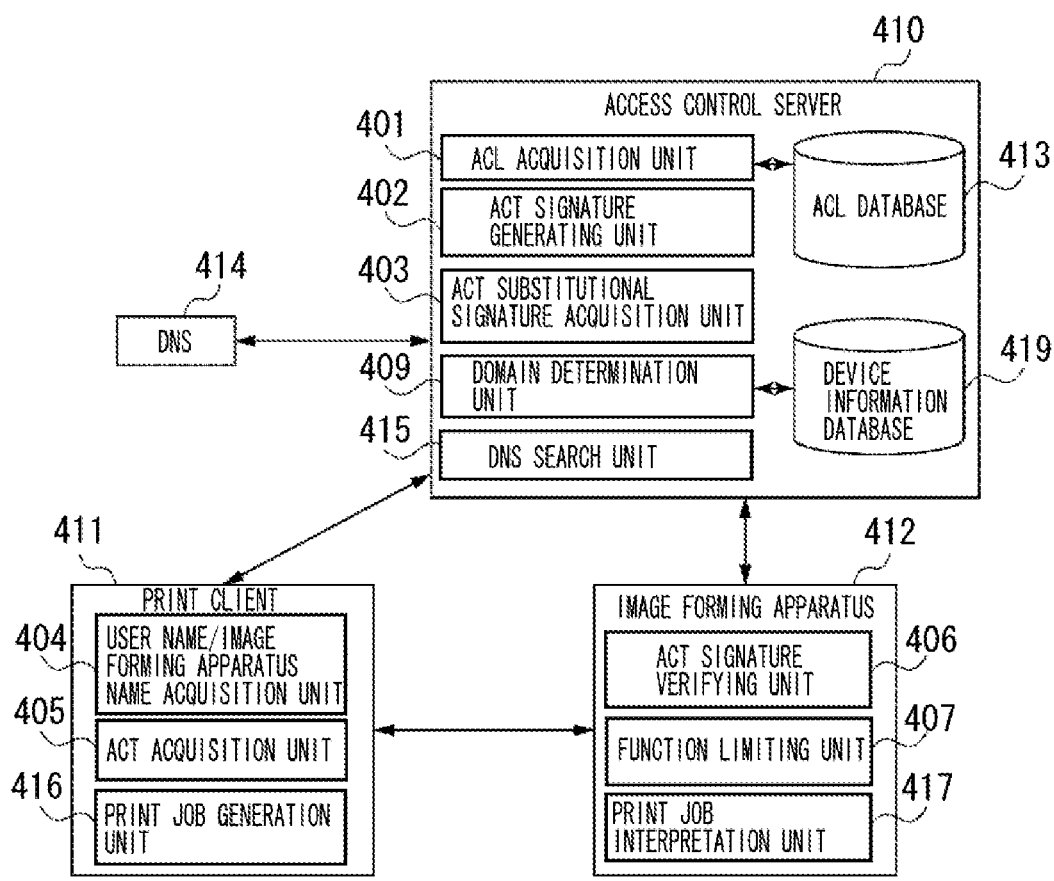
FIG. 4 illustrates a mutual relationship of processes or tasks (programs) executed by a print client, an access control server, an image forming apparatus, and a domain name server (DNS) according to a first exemplary embodiment of the present invention.

FIG. 4 illustrates a mutual relationship of processes or tasks (programs) executed by the print client 101 (or 108), the access control server 102 (or 105), the image forming apparatus 109 (or 107), and the DNS 104 (110). Respective devices can mutually communicate via a network. In FIG. 4, software modules involved in respective devices can collaborate to execute the present invention.

An exemplary connection of the devices illustrated in FIG. 4 may include a connection of devices belonging to different domains, such as a connection of the print client 101 belonging to the domain "A" and the image forming apparatus 107 belonging to the domain "B" illustrated in FIG. 1 in a case where a print client 411 and an image forming apparatus 412 are connected.

An access control server 410 in FIG. 4 represents the access control server 102 (or 105) illustrated in FIG. 1. A print client 411 represents the print client 101 (or 108) illustrated in FIG. 1. An image forming apparatus 412 represents the image forming apparatus 109 (or 107) illustrated in FIG. 1.

An ACL database 413 represents the ACL database 103 (or 106) illustrated in FIG. 1, which stores access control information restricting the function of an image forming apparatus designated for a print of each user. The HDD 306 or the RAM 302 of the access control server 102 (or 105) can store the ACL database. If a data management server for backup use is separately provided, the data management server can store the ACL database.

A DNS 414 represents the DNS 104 (or 110) illustrated in FIG. 1 that can search an IP address according to the FQDN of the image forming apparatus 107 (or 109).

When the print client 411 receives a print request from a user, a user name/image forming apparatus name acquisition unit 404 obtains an FQDN of the user and an FQDN of a print output destination (image forming apparatus) from an application. An ACT acquisition unit 405 sends an ACT request to the access control server 410. The ACT request includes the FQDN of the user and the FQDN of the print output destination (image forming apparatus).

When the access control server 410 receives an ACT request, a domain determination unit 409 compares the obtained FQDN of the user and the FQDN of the print output destination (image forming apparatus) and determines whether the user and the print output destination (image forming apparatus) belong to the same domain.

If the user and the print output destination (image forming apparatus) belong to the same domain, an ACL acquisition unit 401 searches and obtains an ACL by accessing the ACL database 413 belonging to the same domain. An ACT signature generating unit 402 generates an ACT including the obtained ACL restriction information and authentication information. In an exemplary embodiment, the ACT signature generating unit 402 performs signature processing on restriction information for authentication of the ACT in performing print processing.

If the domain of a user is different from the domain of a print output destination (image forming apparatus), a DNS search unit 415 accesses the DNS 414 and searches an IP address of another access control server which is present in the domain of the print output destination (image forming apparatus), with reference to the FQDN of the print output destination (image forming apparatus) and a host name of the access control server as a key.

An ACT substitutional signature acquisition unit 403 accesses an access control server identified according to the obtained IP address which is present in the domain to which the print output destination (image forming apparatus) belongs, and requests an ACT substitutional signature.

The access control server, when it receives an ACT substitutional signature request, causes the ACT signature generating unit 402 to perform substitutional signature processing on the ACT and transmit the signed ACT to the request source (i.e., ACT substitutional signature acquisition unit 403). The ACT substitutional signature acquisition unit 403 transmits, to the print client 411, the ACT with the substitutional signature attached thereon.

A print job generation unit 416 in the print client 411 adds the ACT to a print job and transmits the print job to the print output destination (image forming apparatus) 412. When the image forming apparatus 412 receives a print job, a print job interpretation unit 417 extracts an ACT from the received print job and an ACT signature verification unit 406 verifies the signature of the ACT. If the signature of the ACT is successfully verified, the ACT signature verification unit 406 sends the ACT to a function limiting unit 407. If the signature of the ACT is not successfully verified, it is determined that the print job is not authorized and the print job is canceled.

The function limiting unit 407 interprets the contents of a received ACT, applies functional restrictions to a print job according to the description of the ACT, and performs a print operation.

FIG. 5 illustrates exemplary data stored in the ACL database 413.

A list of device names that each user can use is stored in a "usable device" field. Permission/inhibition information relating to print attributes (color (CL), monochrome (BW), two-sided print, one-sided print, N-UP print, etc) of each user is stored in a "print right" field. Permission/inhibition information relating to service and application (e.g., scan, copy, FAX, print, etc) of each user is stored in an "application/service usage right" field. Each user is inhibited to perform processing if "0" is indicated and permitted to perform processing if "1" is indicated in each attribute. When "2" is described in the "N-UP print" field, the user is restricted only to perform a 2-UP print. When "*" is described in the "N-UP print" field, the user can perform any N-UP print. The number of printable sheets is, for example, the number of printable sheets per month allowed for each user.

According to the example illustrated in FIG. 5, a user "A" can use two devices "iR1" and "lbp2" and can perform a monochrome print, a two-sided print, and a 2-UP print. The user "A" cannot perform a color print and a one-sided print. Furthermore, as illustrated in the "application/service usage right" field, the user "A" can use a copy service, a FAX service, and a print service. The user "A" cannot use a scan service. The ACT indicating restriction information of each user can be generated based on the information stored in this ACL database.

In an exemplary embodiment, the access control information includes print settings of print processing performed by an image forming apparatus and control data for application/service and functions (FAX, scan, copy, etc) performed by an image forming apparatus, as illustrated in FIG. 5. The object to be restricted by the access control information is not limited to the above-described settings or functions and may include data format conversion application and a BOX function.

Figure 9A:
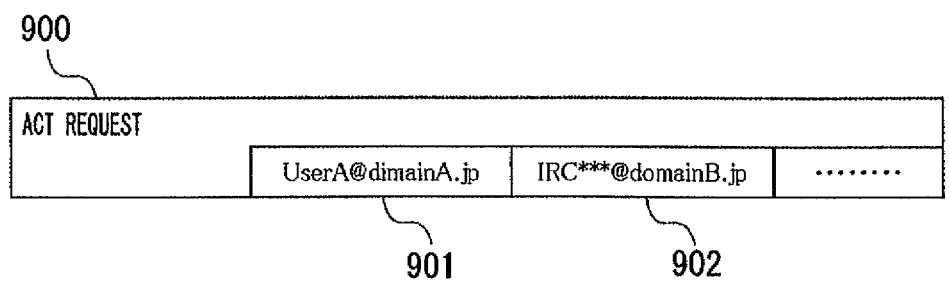
FIG. 9A illustrates an exemplary ACT request and information included in the ACT request.

FIG. 9A illustrates an exemplary ACT request 900 that the print client 101 (or 108) can transmit. The ACT request 900 includes an FQDN 901 of a user who instructs a print and an FQDN 902 of a print output destination (image forming apparatus). The access control server interprets a received ACT request before generating an ACT, and determines a domain of the user and a domain of the image forming apparatus. For example, the FQDN 901 of a print request source (user) is "UserA@domain "A".jp" and the domain of "UserA" is "Domain "A".jp."

Figure 9B:
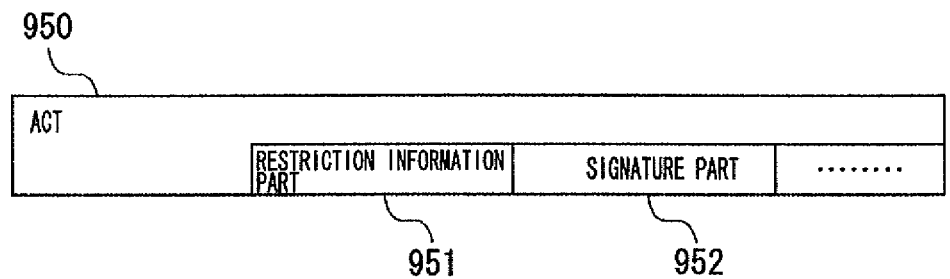
FIG. 9B illustrates an exemplary ACT and information included in the ACT.

FIG. 9B illustrates an exemplary ACT 950 that the access control server 102 (or 105) can generate. The ACT 950 includes a restriction information part 951 and a signature part 952. The restriction information part 951 stores user restriction information obtained from the ACL database 103 (or 106). The signature part 952 stores signature information used by the access control server 102 (or 105) for authentication of a printing operation.

Figure 6:
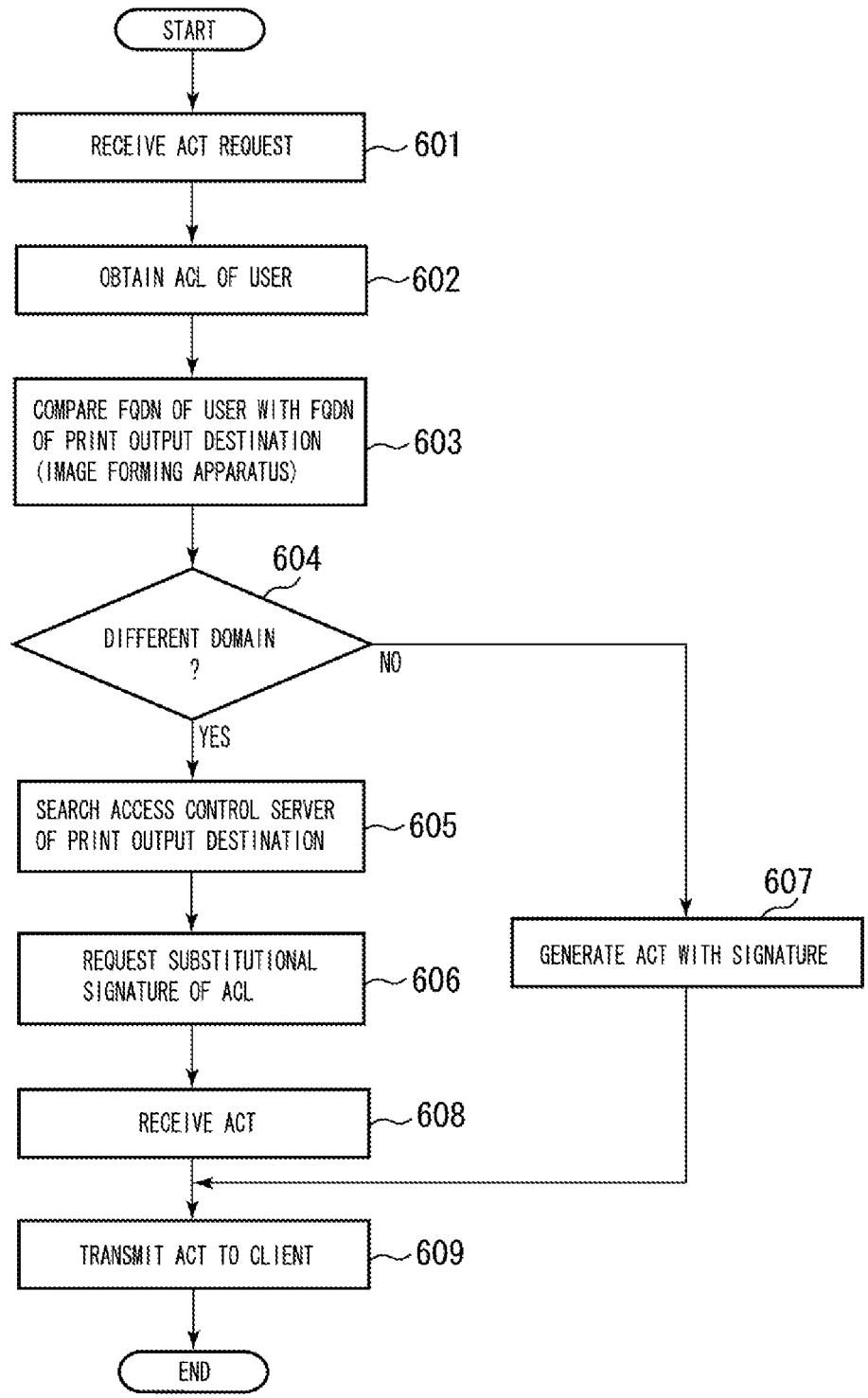
FIG. 6 is a flowchart illustrating access control token (ACT) generation processing executed by an access control server based on a control program according to the first exemplary embodiment.

FIG. 6 is a flowchart illustrating access control token (ACT) generation processing executed by the CPU 301 of the access control server 102 (or 105) according to a control program stored in a storage medium (hard disk, RAM, etc) of the access control server.

This processing is performed in the network configuration illustrated in FIG. 1, i.e., the multi-domain environment including the domain "A" and the domain "B." The domain "A" includes the print client 101, the access control server 102, the ACL database 103, and the DNS 104. The domain "B" includes the access control server 105, the ACL database 106, and the image forming apparatus 107. In this exemplary processing, the print client 101 transmits a print request to the image forming apparatus 107 of the domain "B" (i.e., other domain). An exemplary embodiment may perform the processing in another multi-domain environment.

The CPU 301 of the access control server 102 (or 105) starts the processing of FIG. 6 in response to a reception of an ACT request.

In step 601, the access control server 102 receives an ACT request from a print client.

Step 602 includes a process of referring to the FQDN 901 of a user included in the ACT request 900. The ACL acquisition unit 401 obtains an ACL relating to the user from the ACL database 413 with reference to user information.

In step 603, the domain determination unit 409 refers to the data included in the ACT request 900, and compares the FQDN 901 of the user with the FQDN 902 of the print output destination (image forming apparatus) 107. For example, according to the ACT request 900 illustrated in FIG. 9A, the domain of the FQDN 901 of the user is different from the domain of the FQDN 902 of the print output destination (image forming apparatus) 107.

In step 604, the domain determination unit 409 determines whether a domain of the user who requests a printing operation is identical to a domain of the print output destination (image forming apparatus). If the compared domains are different from each other (YES in step 604), the processing flow proceeds to step 605. If the compared domains are identical (NO in step 604), the processing flow proceeds to step 607.

Step 605 is a process of obtaining, from the DNS, an IP address of the access control server 105 belonging to the domain "B" (i.e., the domain of the print output destination (image forming apparatus) 107) with reference to a domain name in the FQDN of the print output destination (image forming apparatus) 107 and a host name of the access control server 102.

The ACT substitutional signature acquisition unit 403 searches the access control server 105 with reference to the obtained IP address, transmits the user ACL obtained in step 602 to the access control server 105, and requests a substitutional signature of the user ACL (step 606).

More specifically, in an exemplary embodiment, the ACT substitutional signature acquisition unit 403 transmits a substitutional signature request and the ACL to the access control server 105 of the domain "B." The access control server 105 of the domain "B" performs signature processing on the received ACL and generates an ACT. Then, the access control server 105 of the domain "B" transmits the ACT with the substitutional signature put thereon to the access control server 102 of the domain "A." In an exemplary embodiment, the substitutional signature may be required to add authentication information of the domain to the restriction information.

In step 608, the ACT substitutional signature acquisition unit 403 obtains the ACT with the substitutional signature added thereon from the access control server 105.

When the processing flow proceeds from step 604 to step 607, the ACT signature generating unit 402 of the access control server 102 belonging to the domain "A" generates an ACT with reference to the restriction information in the ACL obtained in step 602 and performs signature processing.

Step 609 is a process of transmitting the ACT to the print client 101.

Figure 7:
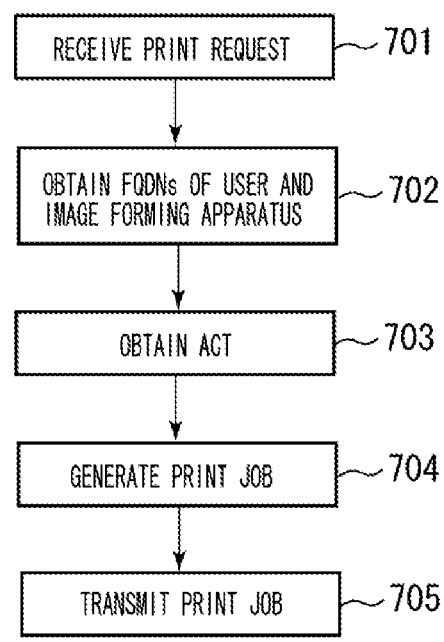
FIG. 7 is a flowchart illustrating an exemplary operation for requesting an image forming apparatus to perform print processing of a print client based on a control program.

FIG. 7 is a flowchart illustrating exemplary processing performed by the print client 101 based on a control program. The CPU 301 of the print client 101 executes this operation according to a control program stored in a storage medium (hard disk, ROM, RAM, etc) of the print client 101.

In step 701, the CPU 301 of the print client 101 receives a print request from an application and starts the processing according to the program.

Step 702 is a process of obtaining an FQDN of a user who has requested a printing operation and an FQDN of a print output destination (image forming apparatus 107) from information included in the print request.

Step 703 includes a process of transmitting an ACT request to the access control server 102. The ACT request includes the FQDN of the image forming apparatus 107 and the FQDN of the user. Step 703 also includes a process of obtaining an ACT from the access control server 102.

Step 704 is a process of generating a print job including the ACT obtained in step 703. Step 705 is a process of transmitting the generated print job to the image forming apparatus 107.

Figure 8:
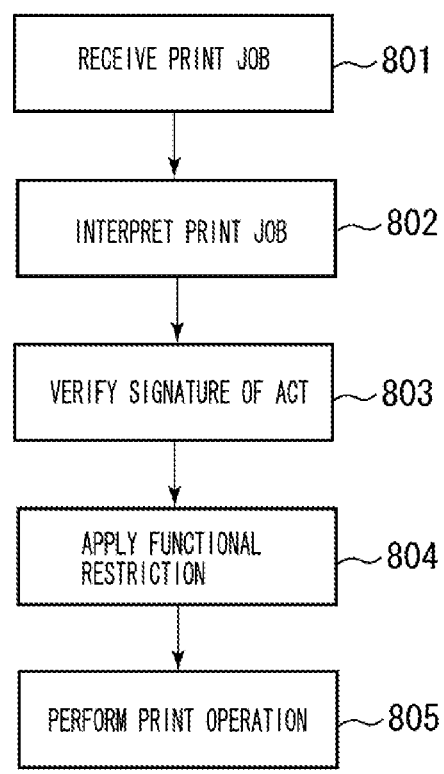
FIG. 8 is a flowchart illustrating exemplary print processing executed by an image forming apparatus based on a control program.

FIG. 8 is a flowchart illustrating exemplary processing performed by the image forming apparatus 107. The CPU 201 of the image forming apparatus 107 executes this processing according to a control program stored in a storage medium (hard disk, ROM, RAM, etc) of the image forming apparatus 107.

Step 801 is a process of receiving a print job from the print client 101.

Step 802 includes a process of extracting the ACT 950 from a print job obtained from the print job interpretation unit 417 and a process of sending the extracted ACT 950 to the ACT signature verification unit 406.

In step 803, the ACT signature verification unit 406 verifies the signature portion 952 of the ACT 950. The signature verification requires a public key of the access control server 105 belonging to the domain "B." If the image forming apparatus 107 does not hold the public key of the access control server 105, the ACT signature verification unit 406 obtains a public key from the access control server 105 of the domain "B" and performs verification of a signature.

According to an exemplary embodiment of the present invention, in the above-described steps 606 and 608, the ACT substitutional signature acquisition unit 403 of the access control server 105 belonging to the domain "B" performs signature processing on the ACT. Therefore, it is assured that the access control server 105 performing signature processing on the ACT and the image forming apparatus 107 belong to the same domain (i.e., domain "B"). Thus, the ACT signature verification unit 406 can verify the signature of the ACT when the image forming apparatus 107 successfully obtains a public key from the access control server 105.

Step 804 includes a process of interpreting the ACT after completing the signature verification and a process of applying usage restriction (e.g., print settings) to a print job according to the interpreted contents. For example, when a print job is set for a color print in a case where the print restriction information is applied to a user who is only allowed to perform a monochrome print, the print settings can be changed to allow a monochrome print. If the print restriction information differs from the information being set for a print job, the print job can be discarded.

Step 805 is a process of performing a print operation of the print job according to the restrictions of the ACT in step 804.

Second Exemplary Embodiment

The above-described first exemplary embodiment has described the print restrictions performed when the domain (domain "A") to which a user (i.e., print client 101) belongs is different from the domain (domain "B") to which a print output destination (i.e., image forming apparatus 107) belongs.

However, the first exemplary embodiment is also applicable to a case where a user directly performs print processing that uses an image forming apparatus belonging to another domain. For example, a user belonging to the domain "A" may directly instruct a print operation via an operation panel of an image forming apparatus belonging to the domain "B."

In FIG. 1, the domain "A" and the domain "B" are logical network domains which are mutually reliable. Therefore, a user of the domain "A" can access a resource of the domain "B" while a user of the domain "B" can access a resource of the domain "A", unless the access is canceled by a network domain administrator.

Furthermore, based on the reliable relationship, user authentication is feasible even when the domain of an Active Directory (AD) is different from the domain of a user. An exemplary authentication protocol is Kerberos. The domain "A" includes an AD 180, and the domain "B" includes an AD 181. The AD (i.e., a server) managed in each domain has a user information management function and a user authentication function. The AD 180 is, for example, a Lightweight Directory Access Protocol (LDAP) server or an Active Directory server.

The image forming apparatus 109 has a "COPY" function for copying a paper document, a "PRINT" function for printing print data transmitted from an external printer driver, and a "SEND" function for transmitting image data of a read paper document to an external file server or a mail address. Furthermore, the image forming apparatus 109 has a "USER AUTHENTICATION" function for identifying a user who uses the image forming apparatus.

To this end, the image forming apparatus 109 has an operation panel that enables a user to input or select user authentication information (user ID, password, domain name, etc) and a slot for a user authentication card.

FIG. 10 illustrates an exemplary registration table that describes image forming apparatuses managed by each domain. In an exemplary embodiment of the present invention, the registration table is provided for each domain to manage device information of image forming apparatuses and peripheral devices belonging to the same domain. The access control server, or a database server, of each domain can store a registration table.

In an exemplary embodiment, the access control server 410 manages a device information database 419 as illustrated in FIG. 4. For example, database registration software or a system management application (not illustrated) may realize the registration of device information into a table.

Furthermore, this table can be used for management of not only the device information of each domain but also information relating to an access control server, a database server, and an ACL database server belonging to another domain.

FIG. 11 illustrates an exemplary ACT which is expressed using the Extensible Markup Language (XML). A portion 751 is a description relating to user information. Each of portions 752 and 753 is a description relating to actual print restrictions.

An exemplary operation, performed when a user belonging to the domain "B" in FIG. 1 uses the image forming apparatus 109 managed by the domain "A", is described below with reference to FIGS. 12, 13, and 14.

Figure 12:
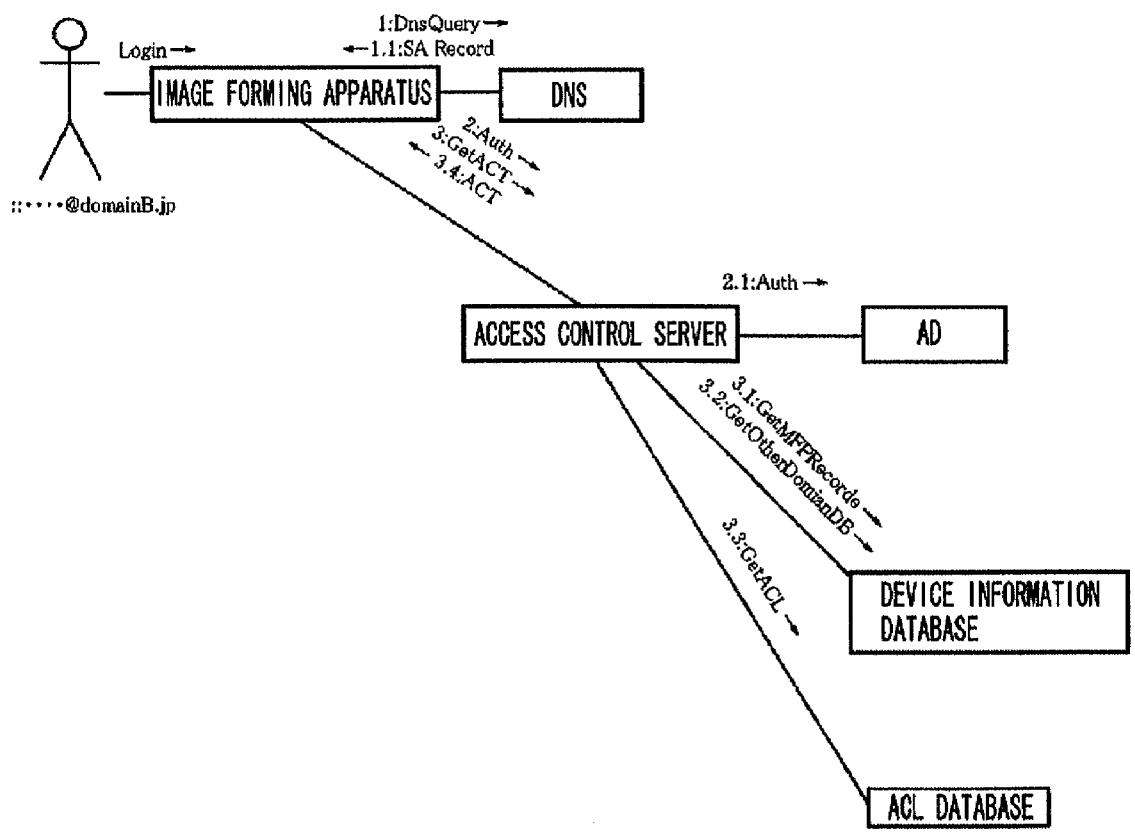
FIG. 12 illustrates a Unified Modeling Language (UML)-based collaboration performed according to a second exemplary embodiment of the present invention.

FIG. 12 illustrates a Unified Modeling Language (UML)-based collaboration in the above-described operation.

Figure 13:
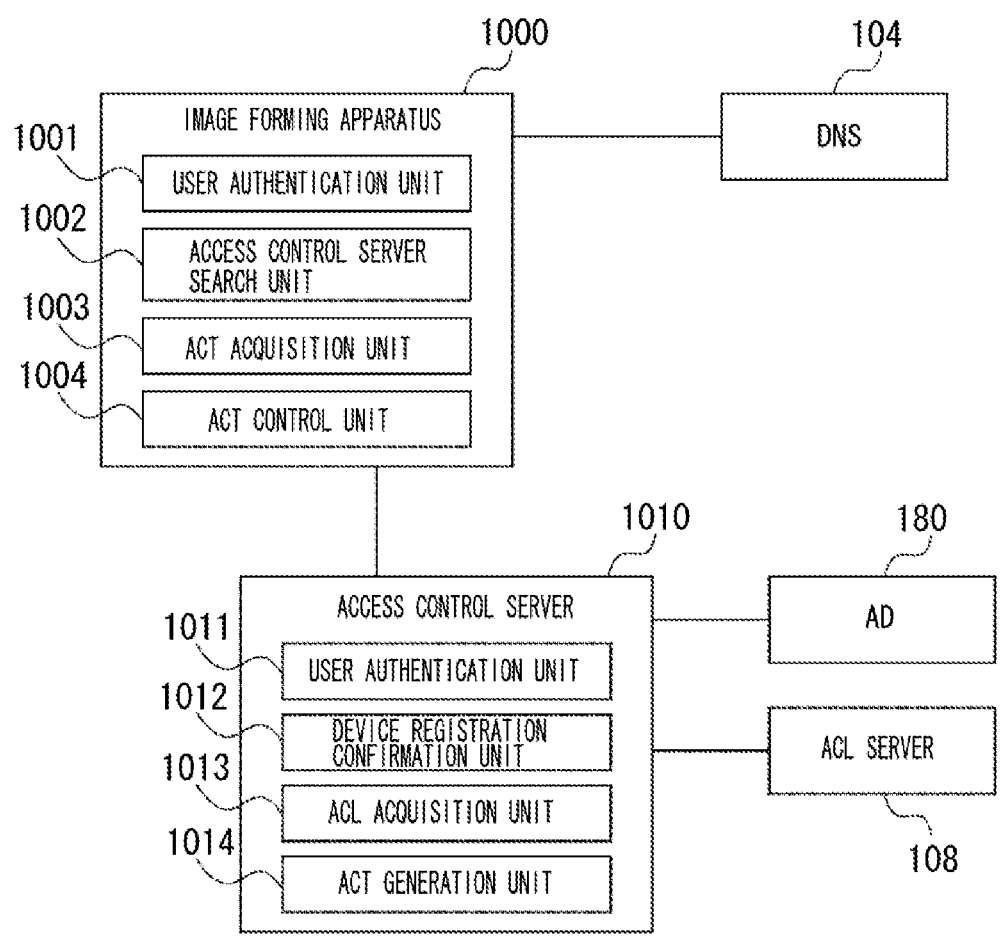
FIG. 13 is a block diagram illustrating software functions of an image forming apparatus and an access control server.

FIG. 13 is a block diagram illustrating software functions of the image forming apparatus 109 and the access control server 102. The software functions illustrated in FIG. 13 may be configured into an arrangement similar to that illustrated in FIG. 4.

A user authentication unit 1001 obtains user identification information (ID, password, domain, etc) input via an operation screen of an image forming apparatus 1000 or from an IC card reader. The user authentication unit 1001 determines whether usage of the image forming apparatus 1000 by an identified user is permitted, based on the obtained user identification information. The user authentication unit 1001 can communicate with an external server to perform authentication processing.

An access control server search unit 1002 identifies a domain to which the image forming apparatus belongs, and accesses the DNS 104 to obtain address information (IP address, port number, etc) of an access control server 1010 belonging to the identified domain.

An ACT acquisition unit 1003 requests a user's ACT from the access control server 1010 and obtains the ACT. An ACT control unit 1004 restricts functions of the image forming apparatus 1000 according to the ACT obtained from the access control server 1010. A user authentication unit 1011 of the access control server 101 performs user authentication processing with reference to the user identification information received from the image forming apparatus 1000.

The user authentication unit 1011 can communicate with the AD 180 to perform the user authentication. Furthermore, the user authentication unit 1011 obtains a user name and a name of a domain to which the user belongs, with reference to the user identification information or using the AD. A device registration confirmation unit 1012 confirms whether the image forming apparatus 1000 that requests an ACT is registered in a first database (DB).

An ACL acquisition unit 1013 accesses the DB and obtains an ACL recorded in the DB.

Furthermore, the ACL acquisition unit 1013 obtains the user information and the domain to which the user belongs. The ACL acquisition unit 1013 can obtain, from a first DB, address information of a second DB which is present in the domain to which the user belongs.

An ACT generation unit 1014 generates an ACT based on the ACL information obtained from the DB and transmits the generated ACT to the image forming apparatus 1000.

A service program running on a terminal performs processes including the above-described processing of the access control server and can all the time receive a request from the image forming apparatus.

Figure 14A:
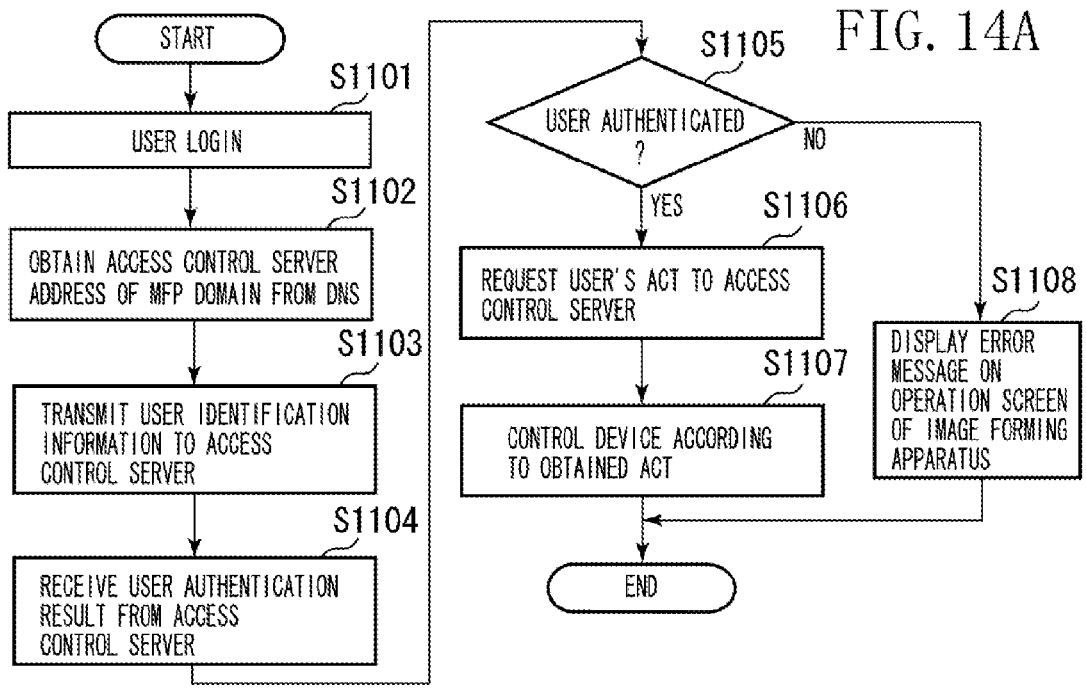
FIG. 14A is a flowchart illustrating exemplary processing performed by an image forming apparatus based on a control program according to the second exemplary embodiment.
Figure 14B:
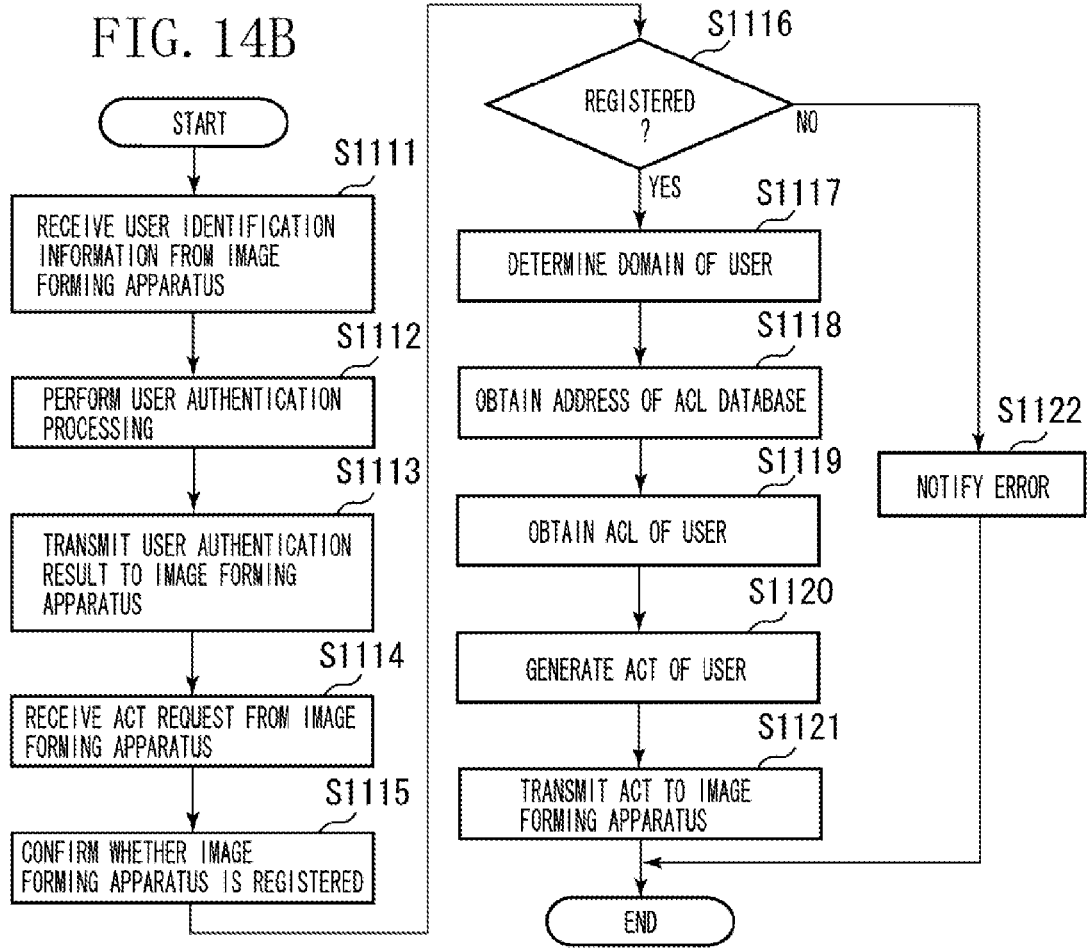
FIG. 14B is a flowchart illustrating exemplary processing performed by an access control server based on a control program according to the second exemplary embodiment.

Exemplary operations of the system will be described below in detail with reference to the flowcharts of FIGS. 14A and 14B. FIG. 14A is a flowchart illustrating exemplary processing performed by an image forming apparatus based on a control program. FIG. 14B is a flowchart illustrating exemplary processing performed by an access control server based on a control program.

First, an exemplary operation of the image forming apparatus 109 is described below with reference to FIG. 14A.

In step S1101, a user inputs or selects user identification information (ID, password, domain, etc) via an operation screen of the image forming apparatus 109, or inserts an IC card into a card reader equipped to the image forming apparatus 109. The image forming apparatus 109 obtains user information through the user's operation. In an exemplary embodiment, a user belonging to the domain "B" logs into the image forming apparatus 109 belonging to the domain "A" and performs image forming processing that uses a function of the image forming apparatus 109.

In step S1102, the image forming apparatus 109 obtains user identification information and identifies, based on the obtained information, a domain (domain "A".jp) to which the image forming apparatus 109 belongs. Furthermore, according to the obtained domain name, the image forming apparatus 109 accesses the DNS 104 and obtains address information of the access control server 102 provided in the identified domain. More specifically, an SRV (Service) record (_SA._tcp. domain "A".jp) of the access control server 102 is registered beforehand in the DNS 104. Therefore, the image forming apparatus 109 can obtain an IP address and a port number by accessing the DNS 104 that stores the SRV record.

In step S1103, the image forming apparatus 109 transmits user identification information to the access control apparatus 102 and requests authentication processing.

In step S1104, the access control server 102 performs authentication processing on the received user identification information with reference to the AD 180. The access control server 102 transmits an authentication result to the image forming apparatus 109. The image forming apparatus 109 receives the authentication result. In general, it is useful to perform the user authentication processing using a challenge/response authentication system that can protect password information against a malicious user.

In step S1105, the ACT acquisition unit 1003 determines a user authentication result. The image forming apparatus determines whether a user has the right to use the image forming apparatus, based on the authentication result. If the user is successfully authenticated (YES in step S1105), the processing flow proceeds to step S1106 (i.e., a step of requesting the access control server 102 to issue an ACT of the user belonging to the domain "B.") If the user authentication is not established (NO in step S1105), the processing flow proceeds to step S1108 in which an error message is displayed on an operation screen of the image forming apparatus and the processing of this routine terminates.

In step S1107, after the ACT acquisition unit 1003 has received the ACT, the image forming apparatus 109 causes the ACT control unit 1004 to control usage of the image forming apparatus by the user B based on ACT information.

The control based on the ACT is, for example, cancellation and resetting of the copy processing from color copy to monochrome copy if the color copy is inhibited according to the ACT information. If the ACT information indicates usability of all functions, an operation screen can display all of the usable functions. If the ACT includes information indicating inhibition of a facsimile (FAX) function, a scanning function, a color copy function, or a staple function, the operation screen does not display a corresponding tag or disables any selection of an inhibited function. Furthermore, if a user selects an inhibited function, an error message can be displayed.

Next, an exemplary operation of the access control server 102 is described below with reference to FIG. 14B.

In step S1111, the access control server 102 receives the user identification information transmitted from the image forming apparatus 109 in step S1103.

In step S1112, the user authentication unit 1011 of the access control server 102 performs authentication processing on the received user identification information for a user belonging to the domain according to the AD 180.

In step S1113, the access control server 102 transmits a user authentication result to the image forming apparatus 109.

In step S1114, the access control server 102 receives the ACT request transmitted from the image forming apparatus 109 in step S1106.

In step S1115, after having received the ACT request transmitted from the image forming apparatus 109, the access control server 102 checks whether an image forming apparatus for which the device registration confirmation unit 1012 has issued an ACT request is registered in the device information database.

If it is determined that the image forming apparatus is registered (YES in step S1116), the processing flow proceeds to step S1117. If it is determined that the image forming apparatus is not registered (NO in step S1116), the access control server 102 identifies the image forming apparatus as an apparatus not being managed by the system. The processing flow proceeds to step S1122. In step S1122, the access control server 102 sends an error notification to the image forming apparatus 109. The image forming apparatus 109, when it receives an error notification, displays an error message on its operation screen (step S1108 in FIG. 14A) and terminates the processing of this routine.

In step S1117, the access control server 102 determines a domain (domain "B".jp) to which the authenticated user belongs.

In step S1118, the access control server 102 obtains address information of the ACL database 106 belonging to the domain (domain "B") of the user. In this case, a database that stores address information of an ACL database of another domain may be provided beforehand in the domain "A." Furthermore, it is useful to access an access control server (e.g., 105) of another domain and request address information of an ACL database belonging to this domain.

In step S1119, the ACL acquisition unit 1013 accesses the ACL database 106 of the domain "B" and obtains an ACL corresponding to the authenticated user. For example, the access control server 102 can access the ACL database 106 directly, or via the access control server 105, to obtain an ACL. In this case, the access control server 102 can transmit a user's ACL acquisition request to the access control server 105. The access control server 105 obtains an ACL from the ACL database 106 based on the ACL acquisition request, and transmits the obtained ACL to the access control server 102.

In step S1120, the ACT generation unit 1014 calculates a usage right of the user based on the obtained ACL and generates an ACT including authentication information of the domain "A" being added. In this case, the authentication information is an electronic signature effective only in the domain "A."

In step S1121, the access control server 102 transmits the generated ACT to the image forming apparatus 109.

In the above-described exemplary embodiment, the image forming apparatus 109 and the access control server 102 can be integrated as a single terminal. In this case, the integrated terminal (image forming apparatus) can function as an access control server that performs user authentication and accesses an AD and other database server. Furthermore, a database server accessible via a network can be integrated with an image forming apparatus.

Third Exemplary Embodiment

The network environment or the management policy of a network administrator may not allow a user to access another domain. In the third exemplary embodiment an ACT can be issued for a user belonging to another domain without accessing an access control server of the user's domain.

Exemplary Application 1

In an exemplary embodiment, an access control apparatus of each domain manages two tables illustrated in FIGS. 15 and 16. A database server accessible via a network can manage these tables, or an image forming apparatus or other device can directly hold these tables.

FIG. 15 illustrates a domain user right management table which describes uniform settings with respect to permission/inhibition when a user of another domain (domain "B", domain "C", etc) uses an image forming apparatus belonging to the domain "A." For example, when "inhibited" is described in the field of a domain "B" user, any domain "B" user cannot use the image forming apparatus belonging to the domain "A." More specifically, if the access control server 102 of the domain "A" receives an ACT issuance request from a domain "B" user, the access control server 102 refers to the domain user right management table of FIG. 15 and does not issue an ACT.

Exemplary Application 2

FIG. 16 illustrates an exemplary ACL data table which is usable in the following exemplary applications 2 to 5 and is managed by the domain "A."

As illustrated in FIG. 16, the ACL data table includes a system default ACL (D100) in addition to domain "A" user's ACLs (U200 to U202). The system default ACL (D100) is uniformly applied based on the domain of a user when a unique ACL is not yet set for a legitimate user managed by the AD 180, when the domain of a user is unknown, or when a user belongs to a non-registered domain.

Exemplary Application 3

In addition, the ACL data table includes ACL information of domain "B" user's ACLs (U300 to U301).

Exemplary Application 4

Furthermore, the ACL data table includes information of default ACLs (D101 and D102) of respective domains. A terminal constituting the access control server can store the default ACL. If an access to the ACL database server 103 fails, the above-described ACL can be used.

For example, when a domain "B" user uses the image forming apparatus 109 belonging to the domain "A", an ACT is issued based on the ACL of D101 or any one of U300 to U302. Furthermore, when a user belonging to a domain other than the domains "A" to "C" uses the image forming apparatus 109 belonging to the domain "A", an ACT is issued based on the system default ACL of D100.

Figure 17:
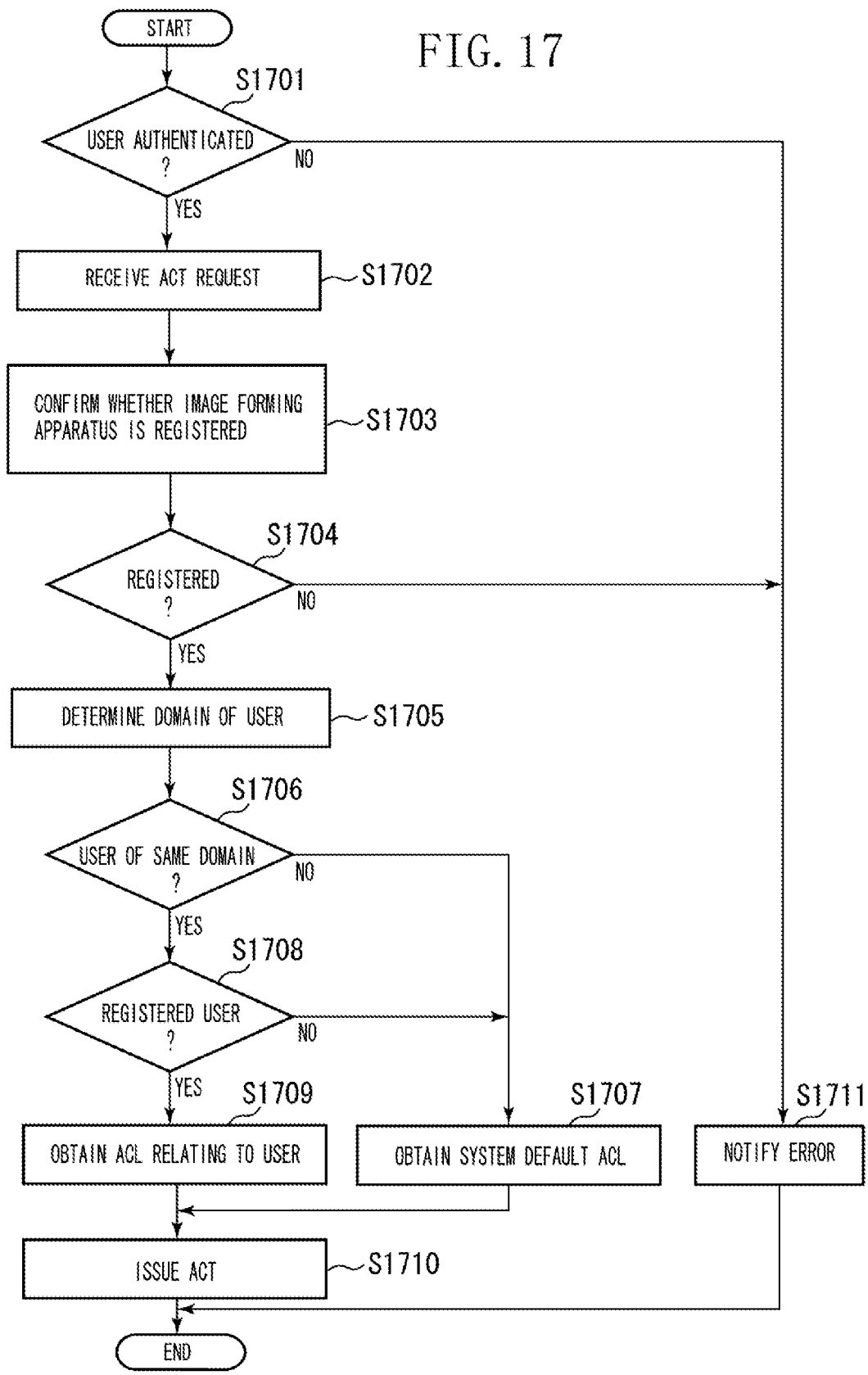
FIG. 17 is a flowchart illustrating operation processing performed by an access control server based on a control program.

FIG. 17 is a flowchart illustrating exemplary operation processing performed by the access control server 102 based on a control program.

In step S1701, the access control server 102 of the domain "A" receives user identification information from an image forming apparatus or a print client and performs user authentication processing.

If a user is successfully authenticated (YES in step S1701), the access control server 102 notifies a user of the result of authentication. In step S1702, the access control server 102 receives an ACT request. If it is determined that user authentication is not established (NO in step S1701), the processing flow proceeds to step S1711. In step S1711, the access control server 102 sends an error notification to the image forming apparatus or the print client and terminates the processing of this routine.

In step S1703, the access control server 102 confirms whether an image forming apparatus to be used by the user is registered in a device information table (FIG. 10) managed by the domain "A."

If the image forming apparatus to be used is registered (YES in step S1704), the processing flow proceeds to step S1705. In step S1705, the access control server 102 determines a domain of the user based on an FQDN included in the ACT request or based on information directly input by a user. If the image forming apparatus to be used is not registered (NO in step S1704), the processing flow proceeds to step S1711 to send an error notification to the image forming apparatus or the print client and terminate the processing of this routine.

If the domain of the user is different from the domain of the access control server 102 (NO in step S1706), the processing flow proceeds to step S1707. In step S1707, the access control server 102 accesses the ACL database server of the domain "A" illustrated in FIG. 16 and obtains a system default ACL.

If the domain of the user is identical to the domain of the access control server 102 (YES in step S1706), the processing flow proceeds to step S1708. In step S1708, the access control server 102 determines whether the user is registered in the ACL database server of the domain "A" illustrated in FIG. 16.

If the user is registered in the ACL database server (YES in step S1708), the processing flow proceeds to step S1709. In step S1709, the access control server 102 obtains an ACL set for the user.

If the user is not registered in the ACL database server (NO in step S1708), the processing flow proceeds to step S1707 to obtain the system default ACL (D100).

In step S1710, the access control server 102 issues an ACT based on the obtained ACL, and transmits the ACT to the image forming apparatus or the print client before terminating the processing of this routine.

Exemplary Application 5

An ACL database server that stores ACL data of other domain users can be separately provided in the domain "A." For example, the ACL database server 106 of the domain "B" can be provided in the domain "A." In each domain, an administrator can change the ACL of a user. This arrangement is effective, for example, when the access control server 102 of the domain "A" cannot access the domain "B" or when an administrator of the domain "A" performs detailed settings of usage right of a domain "B" user who uses an image forming apparatus belonging to the domain "A." When the database capable of storing the ACL for the domain "B" user is provided in the domain "A", the administrator of the domain "A" can freely edit the ACL for the domain "B" user.

Fourth Exemplary Embodiment

It is useful to flexibly combine the above-described first to third exemplary embodiments. The following conditions may be used to select the processing to be performed and change operations of the system according to the selected item:

whether usage by a user of another domain is permitted or inhibited (exemplary application 1);

whether a system default ACL is used for a user of another domain (exemplary application 2);

whether a default ACL of another domain is used for a user of the other domain (exemplary application 3);

whether another domain is accessed (first and second exemplary embodiments); and whether ACL information of another domain is set in the ACL database server of a belonging domain (exemplary applications 4 and 5).

Furthermore, if an error occurs, recovery processing may be performed considering the following error generation conditions:

when access to a database has failed;

when a setting of the database is not found;

when registration of a target user is not found in the database; and when acquisition of an ACL relating to a target user fails.

Further, the following conditions may be used to perform recovery processing:

whether usage by a user of another domain is permitted or inhibited;

whether a system default ACL is used for a user of another domain; and whether a dedicated default ACL is used for a user of another domain.

Any terminal constituting the system can hold the above-described settings. A system management application may allow a user to change the above-described settings.

Other Exemplary Embodiments

A network device is not limited to an image forming apparatus discussed in the first to fourth exemplary embodiments. The present invention can be applied to any information processing device that a user can access via a network.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the disclosure and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An access control apparatus belonging to a first domain in a multi-domain environment, comprising:
    a request unit configured to receive a request for access control information corresponding to a user who gives an instruction via an operation unit of an image forming apparatus for using a function of the image forming apparatus belonging to the first domain, the access control information being used for controlling usage of one or more functions of the image forming apparatus;
    a determination unit configured to determine, based on the received request, whether domain information of the user who gave the instruction via the operation unit of the image forming apparatus belonging to the first domain indicates the first domain; and
    an issuance unit configured to issue, if the domain information of the user indicates the first domain, access control information corresponding to the user in response to the request received by the request unit of the access control apparatus belonging to the first domain,
    wherein, if the domain information of the user indicates a second domain that is different from the first domain, the issuance unit is further configured to issue, for the user, domain default access control information for the second domain as access control information in response to the request received by the request unit of the access control apparatus belonging to the first domain,
    wherein the domain default access control information is prepared in the first domain before the request unit receives the request for the access control information, and
    wherein, according to the domain default access control information issued for the user having the domain information indicating the second domain, the function of the image forming apparatus belonging to the first domain is used.

2. The access control apparatus according to claim 1, wherein the issuance unit is further configured to issue system default access control information as access control information for the user in a case where the domain information of the user indicates the second domain, and
    wherein the system default access control information is prepared beforehand by the first domain, is uniformly applied to all domains, and is used as the access control information for a user belonging to the second domain.

3. The access control apparatus according to claim 1, wherein the access control apparatus and the image forming apparatus belonging to the first domain are integrated as a single apparatus.

4. The access control apparatus according to claim 1, wherein the one or more functions of the image forming apparatus includes any of a scanning function, a copy function, a facsimile function and a print function provided by the image forming apparatus.

5. The access control apparatus according to claim 1, wherein the access control information includes permission information for print attribute settings.

6. A method for controlling an access control apparatus belonging to a first domain in a multi-domain environment, comprising:
    receiving a request for access control information corresponding to a user who gives an instruction via an operation unit of an image forming apparatus for using a function of the image forming apparatus belonging to the first domain, the access control information being used for controlling usage of one or more functions of the image forming apparatus;
    determining, based on the received request, whether domain information of the user who gave the instruction via the operation unit of the image forming apparatus belonging to the first domain indicates the first domain;
    issuing, if the domain information of the user indicates the first domain, access control information corresponding to the user in response to the received request; and
    issuing, for the user, if the domain information of the user indicates a second domain that is different from the first domain, domain default access control information for the second domain as access control information in response to the received request,
    wherein the domain default access control information is prepared in the first domain before the request unit receives the request for the access control information, and
    wherein, according to the domain default access control information issued for the user having the domain information indicating the second domain, the function of the image forming apparatus belonging to the first domain is used.

7. The method according to claim 6, further comprising issuing system default access control information as access control information for the user in a case where the domain information of the user indicates the second domain, and
wherein the system default access control information is prepared beforehand by the first domain, is uniformly applied to all domains, and is used as the access control information for a user belonging to the second domain.

8. The method according to claim 6, wherein the access control apparatus and the image forming apparatus belonging to the first domain are integrated as a single apparatus.

9. The method according to claim 6, wherein the one or more functions of the image forming apparatus includes any of a scanning function, a copy function, a facsimile function and a print function provided by the image forming apparatus.

10. A non-transitory computer-readable storage medium storing a program that causes a computer to execute a method for controlling an access control apparatus belonging to a first domain in a multi-domain environment, comprising:
receiving a request for access control information corresponding to a user who gives an instruction via an operation unit of an image forming apparatus for using a function of the image forming apparatus belonging to the first domain, the access control information being used for controlling usage of one or more functions of the image forming apparatus;
determining, based on the received request, whether domain information of the user who gave the instruction via the operation unit of the image forming apparatus belonging to the first domain indicates the first domain;
issuing, if the domain information of the user indicates the first domain, access control information corresponding to the user in response to the received request; and
issuing, for the user, if the domain information of the user indicates a second domain that is different from the first domain, domain default access control information for the second domain as access control information in response to the received request,
wherein the domain default access control information is prepared in the first domain before the request unit receives the request for the access control information, and
wherein, according to the domain default access control information issued for the user having the domain information indicating the second domain, the function of the image forming apparatus belonging to the first domain is used.

11. The non-transitory computer-readable storage medium according to claim 10, further comprising:
issuing system default access control information as access control information for the user in a case where the domain information of the user indicates the second domain,
wherein the system default access control information is prepared beforehand by the first domain, is uniformly applied to all domains, and is used as the access control information for a user belonging to the second domain.

12. The non-transitory computer-readable storage medium according to claim 10, wherein the access control apparatus and the image forming apparatus belonging to the first domain are integrated as a single apparatus.

13. The non-transitory computer-readable storage medium according to claim 10, wherein the one or more functions of the image forming apparatus includes any of a scanning function, a copy function, a facsimile function and a print function provided by the image forming apparatus.

* * * * *